United States Patent
Tsang et al.

(10) Patent No.: US 8,759,777 B2
(45) Date of Patent: Jun. 24, 2014

(54) INFRARED LIGHT DETECTING APPARATUS AND DETECTING METHOD THEREOF

(75) Inventors: Koon-Wing Tsang, Fremont, CA (US); Cheng-Chieh Huang, Taipei (TW); Sheng-Wen Huang, Taipei (TW); Jinn-Ann Kuo, Taipei (TW)

(73) Assignee: Capella Microsystems (Taiwan), Inc., New Taipei (TW)

( * ) Notice: Subject to any disclaimer, the term of this patent is extended or adjusted under 35 U.S.C. 154(b) by 261 days.

(21) Appl. No.: 13/342,696

(22) Filed: Jan. 3, 2012

(65) Prior Publication Data
US 2013/0168552 A1 Jul. 4, 2013

(51) Int. Cl.
*G01J 5/02* (2006.01)
(52) U.S. Cl.
USPC .......................................... 250/340; 250/349
(58) Field of Classification Search
USPC .................................. 250/340, 349
See application file for complete search history.

(56) References Cited

U.S. PATENT DOCUMENTS

| 6,744,068 B2 * | 6/2004 | Fossum et al. ............... 257/59 |
| 2004/0178466 A1 * | 9/2004 | Merrill et al. ............... 257/440 |
| 2010/0012841 A1 * | 1/2010 | Rafferty et al. ............... 250/332 |
| 2010/0201834 A1 * | 8/2010 | Maruyama et al. ........ 348/222.1 |

FOREIGN PATENT DOCUMENTS

| EP | 0313231 A2 | 4/1989 |
| TW | 200924204 A | 7/1997 |

* cited by examiner

Primary Examiner — David Porta
Assistant Examiner — Mindy Vu
(74) Attorney, Agent, or Firm — Wang Law Firm, Inc.; Li K. Wang; Stephen Hsu

(57) ABSTRACT

An infrared light detecting device and the infrared detecting method thereof. The device comprises a shield, a first photo detector and a second photo detector. The shield for blocking light is located above the first photo detector and the second photo detector. An opening is disposed on the shield above the first photo detector. In addition, there is a gap arranged between the first photo detector and the second photo detector. The first photo detector can detect the light passing through the opening to generate a photo sensing signal and couple an infrared light signal in the photo sensing signal to the second photo detector in order to output the infrared light signal.

16 Claims, 12 Drawing Sheets

INFRARED LIGHT DETECTING APPARATUS AND DETECTING METHOD THEREOF

BACKGROUND OF THE INVENTION

1. Field of the Invention

The present invention relates to a photo-sensing device, and more particularly to an infrared light detecting apparatus and the detecting method thereof capable of effectively detecting infrared light having longer wavelength in light.

2. Description of the Related Art

In recent years, optical sensors applications become very popular in electronic products. For example, ambient light sensors (ALS), proximity sensors and color RGB sensors are applied to smart phones, desktop computers, laptop computers, tablet computers, liquid crystal displayer (LCD), plasma TVs, optical analyzers, lights, ATM machines and Kiosh stations that need to detect specific light sources.

Taking the ambient light sensors applied to the smart phone for example, the ambient light sensor can detect the ambient light around the smart phone to allow the smart phone to adjust the brightness of the display in accordance with the intensity of ambient light, thereby extending the standby time of the smart phone. However, the light emitted by the light sources, such as incandescent lamps, sunlight or halogen lamps, often contains a very strong infrared portions having longer wavelength. Consequently, even the most sophicated ambient light sensor system may suffer noise problem contributed by the infrared light, which reduces the accuracy thereof. Similarly, other light sensor systems may also suffer from the same infrared noise. Therefore, designing an effective infrared light detecting apparatus, which operates as a correction or cancellation factor for the optical sensing system, and easily integrated with other mainstream integrated circuit manufacturing process like CMOS, is an important issue that needs to be overcome.

SUMMARY OF THE INVENTION

In view of the shortcomings of the prior art, the inventor(s) of the present invention based on years of experience in the related industry to conduct extensive researches and experiments, and finally developed an infrared light detecting apparatus and the detecting method thereof as a principle objective to improve the accuracy of a photo sensing system in prior arts.

To achieve the foregoing objective of the present invention, an infrared light detecting apparatus is disclosed and comprises a shield for blocking light; at least one first photo detector located below the shield, and an opening being disposed on the shield at the position corresponding to the at least one first photo detector; and at least one second photo detector located below the shield, the at least one first photo detector collecting light passing through the opening to generate a photo sensing signal, and partially couples the photo sensing signal to the at least one second photo detector.

Preferably, a gap is further arranged between the at least one first photo detector and the at least one second photo detector, in which the coupling visible and infrared wavelengths of the partially coupled photo sensing signal to the at least one first photo detector is varied according to a distance of the gap.

Preferably, the opening is smaller than an area of the at least one first photo detector.

Preferably, the shape of the opening is a cross, a circle, a triangle, a rectangle or a polygon.

Preferably, the at least one first photo detector and the at least one second photo detector can be disposed on the same plane.

Preferably, the at least one first photo detector can be disposed above or on the at least one second photo detector.

Preferably, the material of the shield comprises aluminum, copper, polysilicon or a black polymer dielectric layer.

To achieve the foregoing objective of the present invention, an infrared detecting method is further provided and comprises the following steps of: utilizing at least one first photo detector to collect light passing through an opening of a shield above the at least one first photo detector to generate a photo sensing signal; partially coupling the photo sensing signal to the at least one second photo detector from the at least one first photo detector; and outputting the partially coupled photo sensing signal through the at least one second photo detector.

Preferably, the detecting method further comprises the following steps of: regulating the distance of the gap arranged between the at least one first photo detector and the at least one second photo detector to change the coupling visible and infrared wavelengths of the partially coupled photo sensing signal from the at least one first photo detector.

Preferably, the opening is smaller than an area of the at least one first photo detector.

Preferably, the shape of the opening is a cross, a circle, a triangle, a rectangle or a polygon.

Preferably, the at least one first photo detector and the at least one second photo detector may be disposed on the same plane.

Preferably, the at least one first photo detector may be disposed above or on the at least one second photo detector.

Preferably, the material of the shield comprises aluminum, copper, polysilicon or a black polymer dielectric layer.

Preferably, the first photo detector and the second photo detector are photo diodes.

The infrared light detecting apparatus and the detecting method thereof of the present invention may have one or more advantages as the following:

(1) The infrared light detecting apparatus and the detecting method thereof of the present invention can be easily integrated with mainstream integrated circuit manufacturing processes like CMOS or BiCMOS, and therefore highly practicable.

(2) The infrared light detecting apparatus and the detecting method can effectively detect the infrared portions of light having longer wavelength and could therefore serve as a correction factor to cancel infrared noise sensed by a photo sensing system to enhance the accuracy thereof.

(3) The infrared light detecting apparatus and the detecting method thereof can change the coupling visible and infrared wavelengths of the partially coupled photo sensing signal to the second photo detector by regulating the distance of the gap, thereby having greater flexibility.

DETAILED DESCRIPTION OF THE PREFERRED EMBODIMENTS

The foregoing and other technical characteristics of the present invention will be clearly described with the following detailed description of the preferred embodiments and the illustration of the related drawings.

The infrared light detecting apparatus of the present invention can be utilized for sensing various light sources with infrared lights, such as the light generated by incandescent lamps or halogen lamps, or, sunlight. By integrating the present invention with ordinary ambient light sensors (ALS), proximity sensors or color RGB sensors, the accuracy of light detection system can be improved. The infrared light detecting apparatus of the present invention can be applied to smart phones, desktop computers, laptops, tablet computers, liquid crystal displayer (LCD), plasma TV, optical analyzers, lights, ATM machines and Kiosh stations and other electronic devices having the need of detecting specific light sources.

Figure 1:
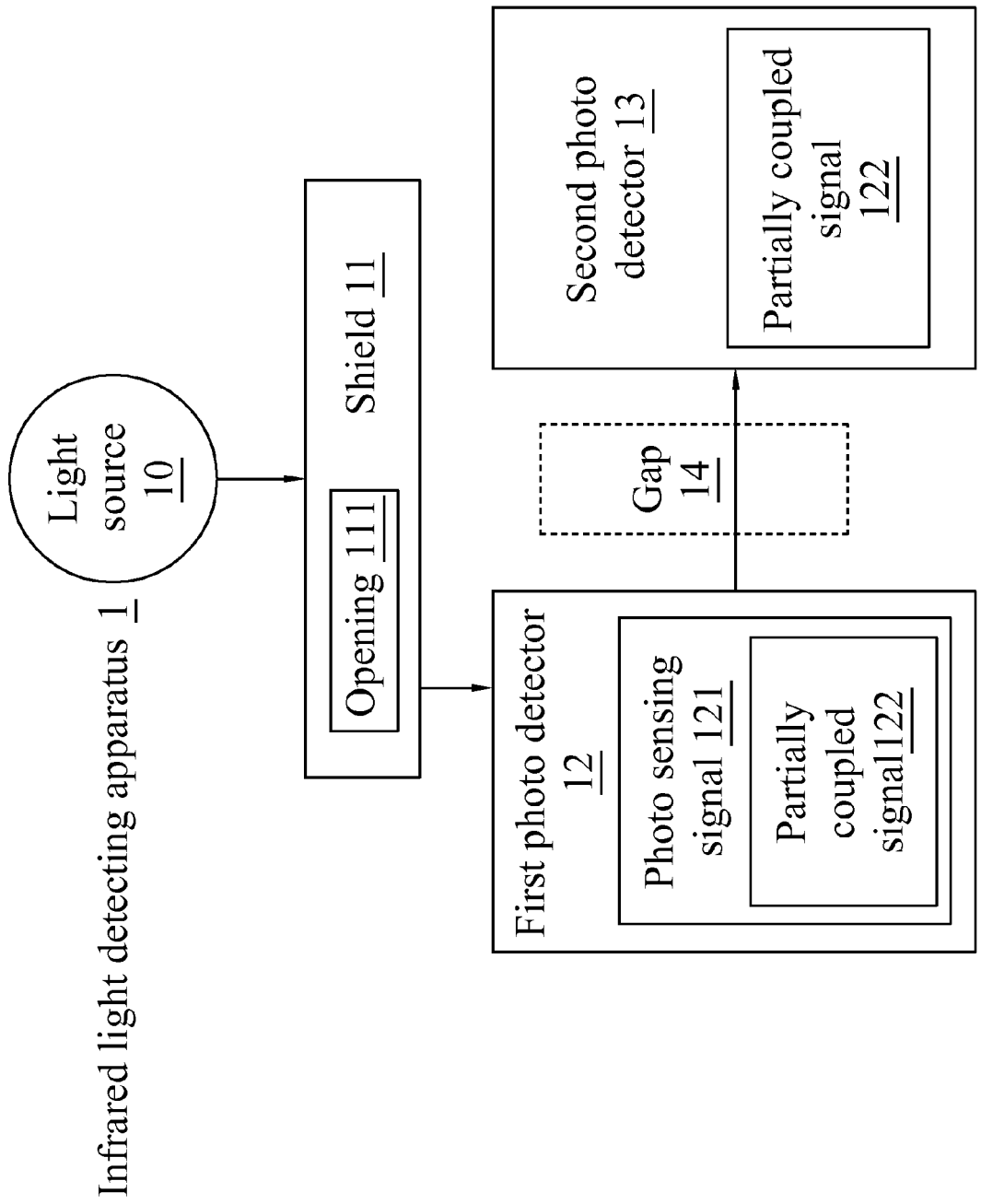
FIG. 1 is a block diagram of an infrared light detecting apparatus according to a first embodiment of the present invention.

Please refer to FIG. 1, which is a block diagram of an infrared light detecting apparatus according to a first embodiment of the present invention. As shown in the figure, the infrared light detecting apparatus 1 comprises a shield 11, a first photo detector 12, a second photo detector 13 and a gap 14. The first photo detector 12 and the second photo detector 13 may be photo sensing elements such as photo diodes. The shield 11 is used for blocking the light beam, and the material may include aluminum, copper, polysilicon or black polymer dielectric layers capable of effectively blocking visible light and infrared light.

The first photo detector 12 is designed to be partially shielded, and an opening 111 is disposed on the shield 11 at a position corresponding to the first photo detector 12. Generally, the opening 111 is smaller than the area occupied by the first photo detector 12. The sizes of the opening 111 and the first photo detector 12 can be regulated upon actual applications. The light beam emitted by the light source 10 may pass through the opening 11, so that the first photo detector 12 generates a photo sensing signal 121. In the meantime, a portion of the photo sensing signal 121 would be coupled to the second photo detector 13, which will be referred to as the partially coupled signal 122 hereafter. The second photo detector 13 is designed to be fully shielded by the shield 11, and therefore there is no opening disposed on the shield 11 at the position corresponding to the second photo detector 13. Therefore, the photo signals sensed by the second photo detector 13 are completely contributed by coupling from the first photo detector 12.

It should be noted the light signals with longer wavelength (IR), such as 900 nm, have a typical longer penetrate depth of more than 10 μm in to the silicon substrates. And therefore, the IR generated photocurrent has significant coupling to the fully shielded photo detector, e.g., the second photo detector 13. To the contrary, light signals with shorter wavelength (less than 650 nm) have sallower penetration depth of 3.3 μm, such that the generated photocurrent thereby remains closer to the surface region of the silicon substrates. Therefore, the photocurrent generated by light signals with shorter wavelength has insignificant coupling to the fully shielded photo detector. And therefore, the present invention uses the differences of the optical penetration depth capabilities on the silicon substrate between lights with different wavelength as the principle to design the photo sensing device, such that the photo sensing device can provide both IR and radiometric photocurrents to improve the ambient light and RGB color sensing accuracy under various light sources. In the photo sensing device in accordance with the present invention, the signals generated by the partially shielded sensor are used as the radiometric reference signal and the fully shielded photo detector collects the infrared photocurrent, and thereby the system is able to differentiate light sources with strong IR components.

Additionally, the infrared light detecting apparatus 1 can change the coupling visible and infrared wavelengths of partially coupled signal 122 coupled to the second photo detector 13 by regulating the distance of the gap 14 between the first photo detector 12 and the second photo detector 13. The shorter the distance of the gap 14, the bigger the coupling visible and infrared wavelengths of the partially coupled signal 122 would be. On the other hand, the longer the distance of the gap 14, the smaller the coupling visible and infrared wavelengths of partially coupled signal 122 would be.

The infrared light detecting apparatus 1 of the present invention can effectively detect the infrared portions having longer wavelength of light. Further, the coupling visible and infrared wavelengths of the partially coupled signal 122 can be controlled by regulating the distance of the gap 14, thereby meeting various demands. The infrared light detecting apparatus 1 of the present invention can be integrated with ambient light sensors and color sensors to calibrate the infrared noise detected thereby, or can be independently used to detect the infrared portions with longer wavelength in light.

Figure 2:
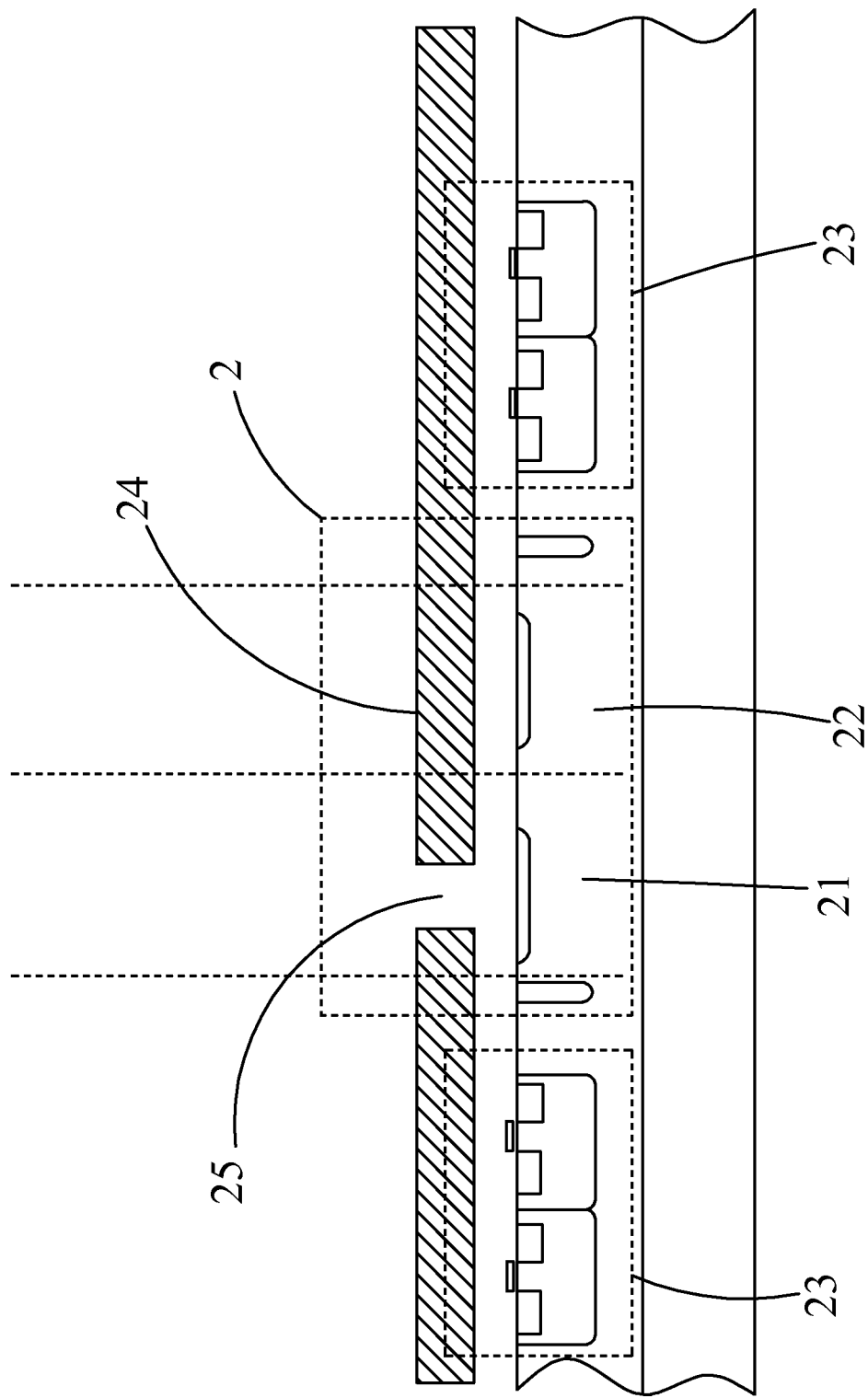
FIG. 2 is a schematic diagram of an infrared light detecting apparatus according to a second embodiment of the present invention.

Please refer to FIG. 2, in which a schematic diagram of an infrared light detecting apparatus according to a second embodiment of the present invention is depicted. The infrared light detecting apparatus 2 of the present invention is integrated into with the mainstream CMOS (metal oxide semiconductor) element 23. The shield 24 above the photo diode 21 is disposed with an opening 25 that allows the light to pass therethrough. On the other hand, the shield 24 above the photo diode 22 can completely block the light. The photo diode 21 can detect light through the opening 25 on the shield 24 and generate the photo sensing signal. The infrared portion having longer wavelength in light of the photo sensing signal is then coupled to the photo diode 22. With the specific design of the infrared light detecting apparatus 2, ordinary photo diodes can be taken as sensing elements such that the elements can be easily integrated into on-chip CMOS or BIC-MOS signal processing solution, so as to effectively reduce the production costs.

Figure 3:
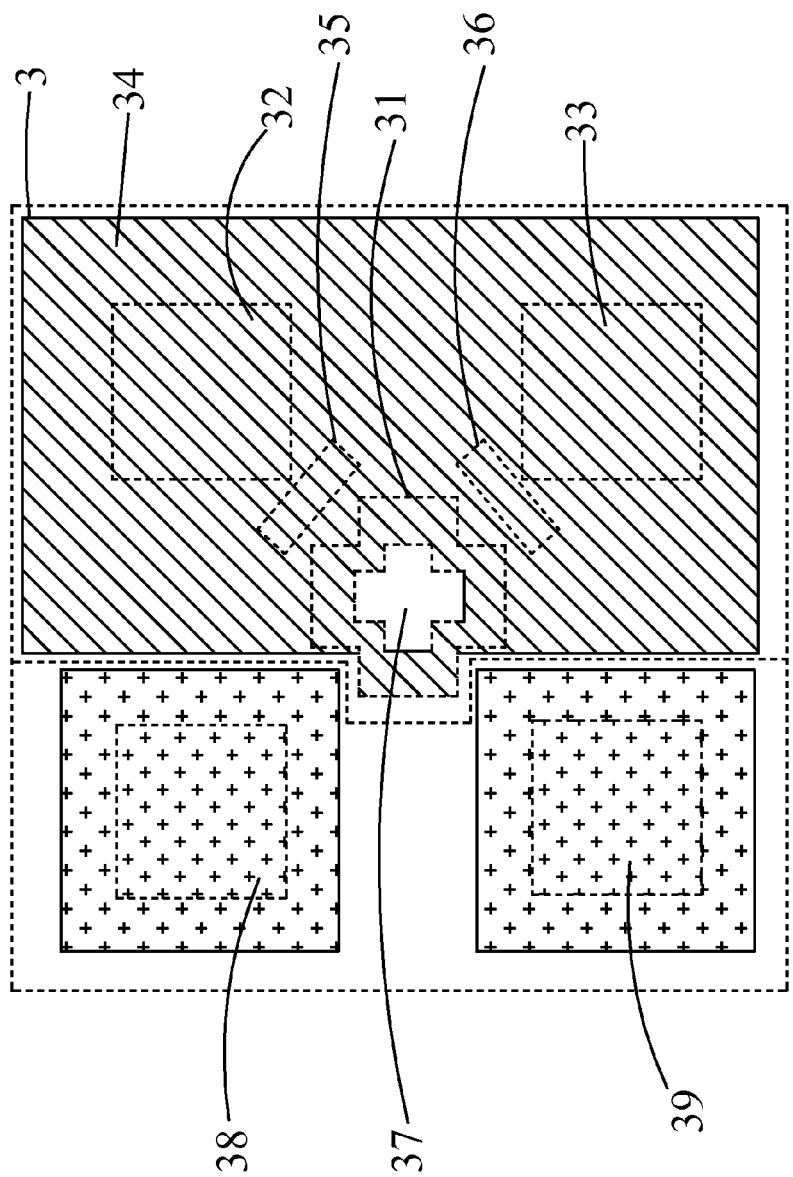
FIG. 3 is a schematic diagram of an infrared light detecting apparatus according to third embodiment of the present invention.

With reference to FIG. 3, in which a schematic diagram of an infrared light detecting apparatus according to a third embodiment of the present invention is depicted. In the embodiment, the infrared light detecting apparatus 3 of the present invention is integrated with ambient light sensors 38 and 39. The photo diodes 32 and 33 are completely shielded and the photo diode 31 adapts a design of partial shielding. The photo diodes 32 and 33 are apart from the photo diode 31 through respective gaps 35 and 36. Of course, in actual practice, the distance of the gaps 35 and 36 can be adjusted to change the coupling visible and infrared wavelengths of the photo sensing signals being able to be coupled to the photo diodes 32 and 33, thereby meeting different design requirements. The photo diode 31 detects the radiometric light signal passing through a cross opening 37 disposed on the shield 34 and partially couples the photo sensing signals to the photo diodes 32 and 33. The shapes of the opening 37 and the photo diode 31 can be modified in accordance with demands of actual implementation. In the embodiment, the shape of the opening 37 is a cross in which the area is smaller than the photo diode 31. The shape of the opening can be differently designed in accordance with the shape of the photo diode 31, and can be other shapes such as a circle, a triangle, a rectangle or a polygon. In addition, the numbers of the partially shielded photo diode 31 and the completely shielded photo diodes 32 and 33 can also be adjusted in accordance with actual demands, without any limitations.

Figure 4:
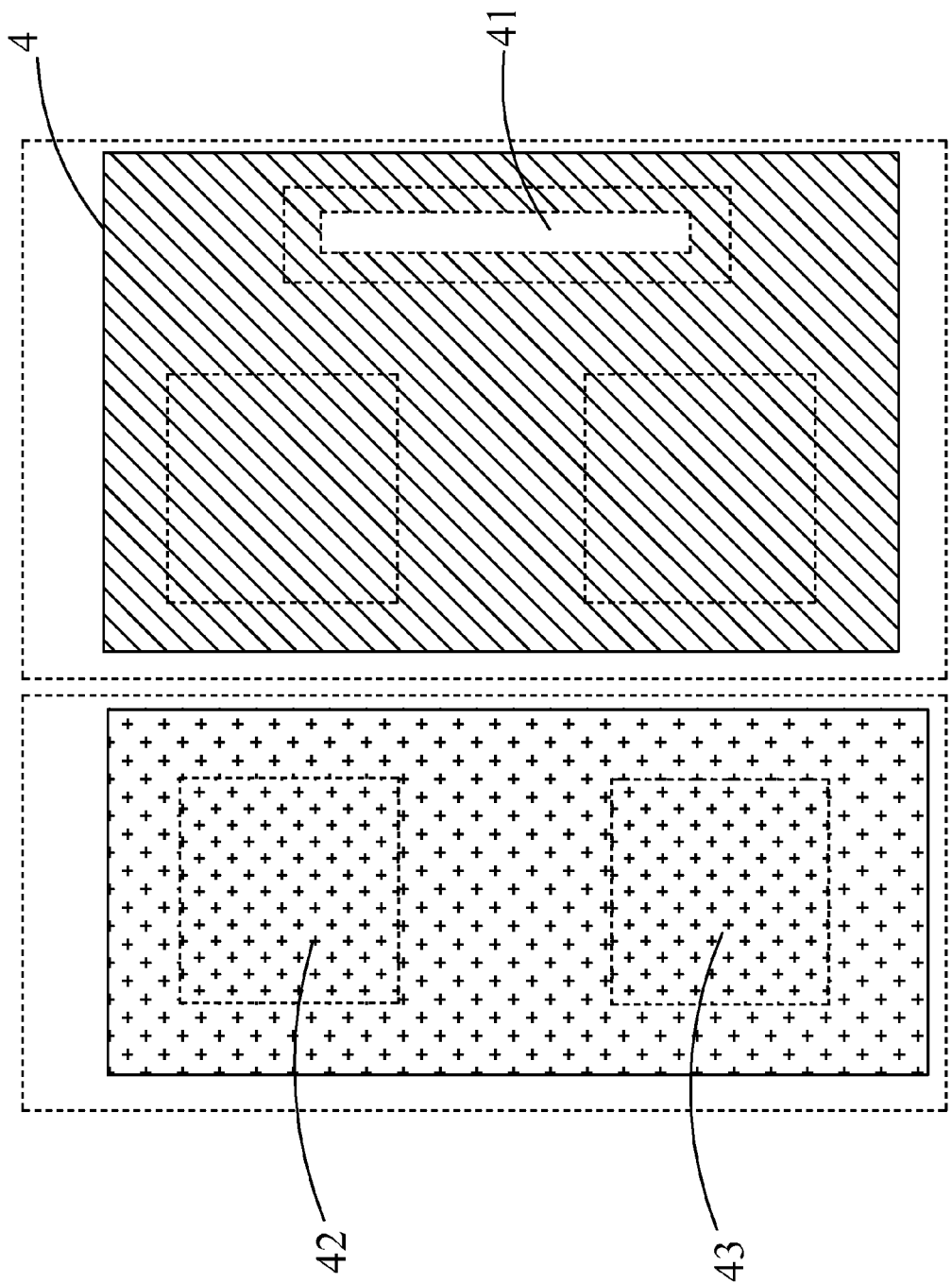
FIG. 4 is a schematic diagram of an infrared light detecting apparatus according to a fourth embodiment of the present invention.

With reference to FIG. 4, in which a schematic diagram of an infrared light detecting apparatus according to a fourth embodiment of the present invention is depicted. As shown the figure, the infrared light detecting apparatus 3 is integrated with the ambient light sensors 42 and 43. Unlike FIG. 3, in this embodiment, the opening 41 of the infrared light detecting apparatus 4 is a rectangular design, and the position of the photo diode is also different.

Figure 5:
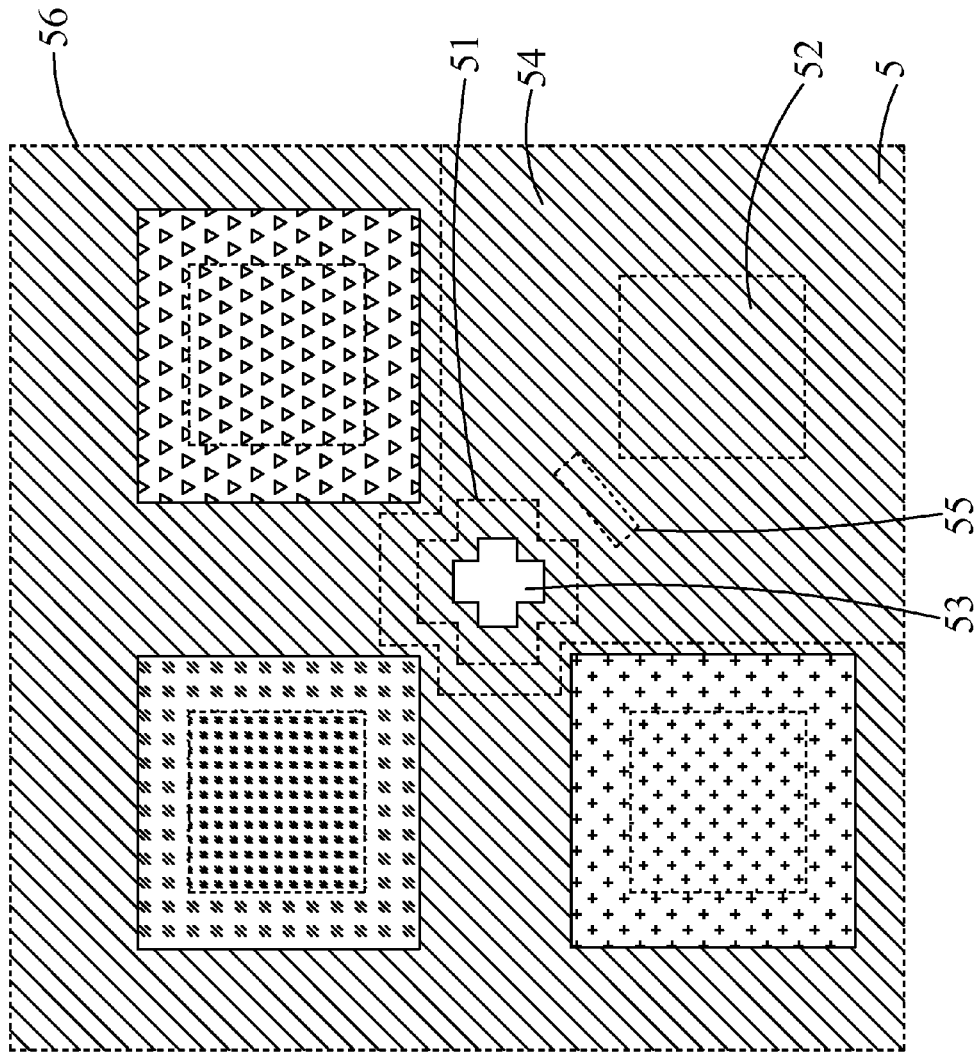
FIG. 5 is a schematic diagram of an infrared light detecting apparatus according to a fifth embodiment of the present invention.

With reference to FIG. 5, in which a schematic diagram of an infrared light detecting apparatus according to a fifth embodiment of the present invention is depicted. As shown in the figure, the infrared light detecting apparatus 5 of the present invention is integrated with multi-color RGB sensor 56 with Fabry-Perot filters. The photo diode 52 is completely shielded, and the photo diode 51 is partially shielded. The opening 53 disposed on the shield 54 and the photo diode 51 are cross in shape. The photo diodes 51 and 52 are disposed on two sides of a gap 55. The multi-color RGB sensor 56 can sense light having three different wavelength ranges.

Figure 6:
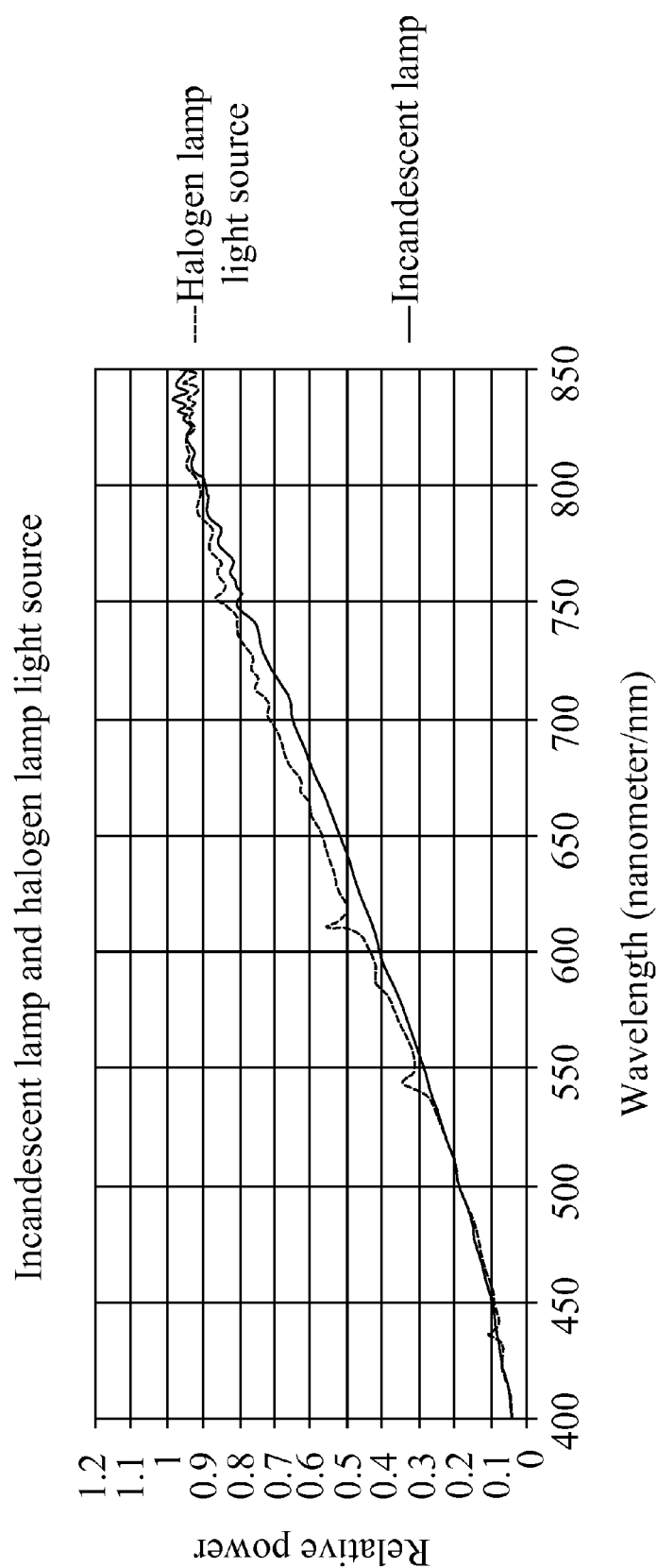
FIG. 6 is a spectrogram of an incandescent lamp and a halogen lamp.

With reference to FIG. 6, in which spectrograms of light sources of an incandescent lamp and a halogen lamp are depicted. As shown in the figure, the halogen lamp and the incandescent lamp also contain infrared portions in which the wavelength is above 700 nm. Therefore, when the multi-color RGB sensor 56 detects the incandescent lamp and the halogen lamp, much unnecessary noise may be simultaneously detected to cause the detection error.

Figure 7A:
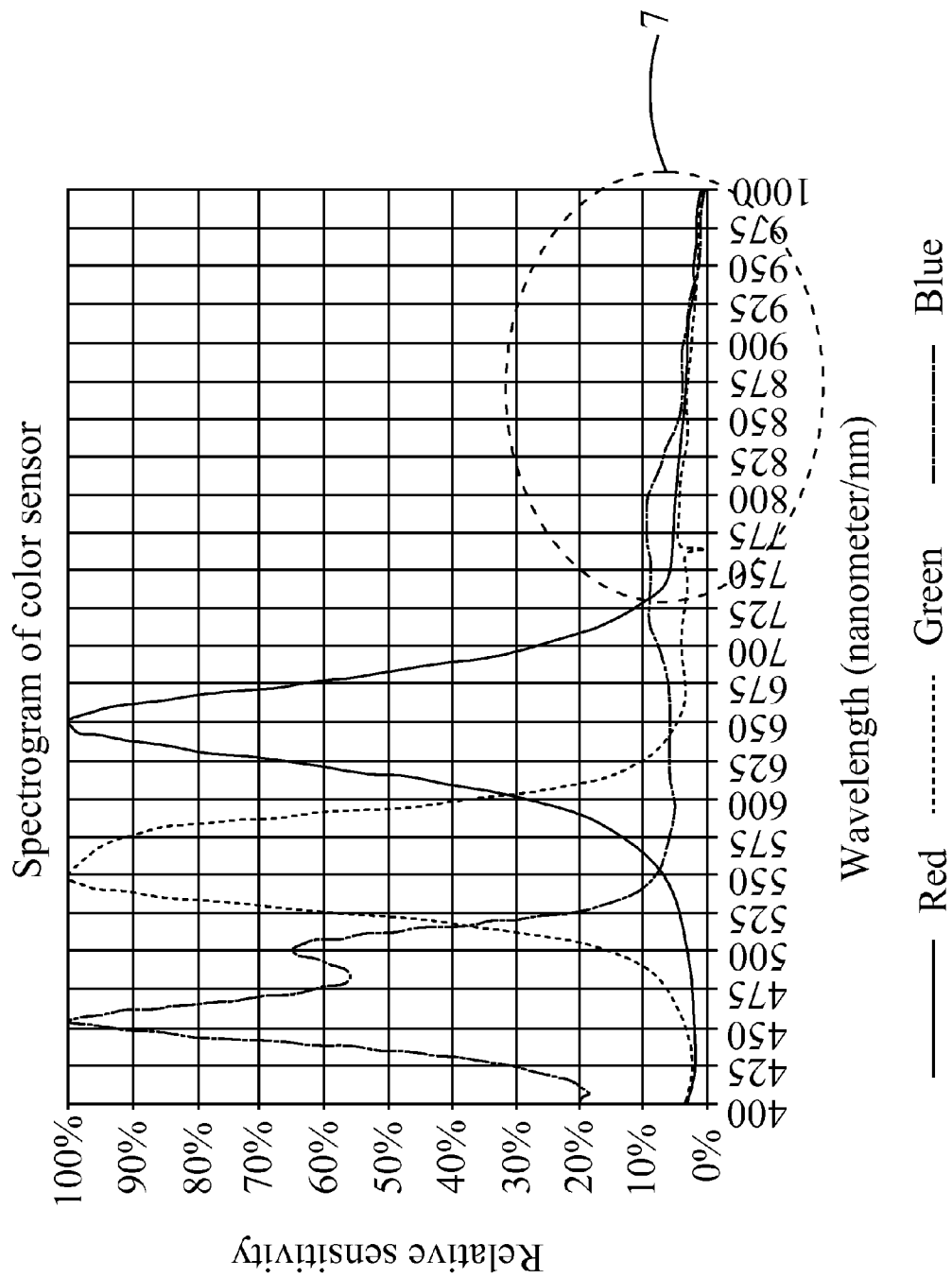
FIG. 7A is a spectrogram of a color sensor of an infrared light detecting apparatus according to the fifth embodiment of the present invention.

With reference to FIG. 7A, in which a spectrogram of the color sensor of the infrared light detecting apparatus according to the fifth embodiment of the present invention is depicted. As shown in the figure, when the multi-color RGB sensor 56 detects the incandescent lamp, a noise 7 may be generated in addition to a normal sensing signal, and which is mainly contributed by the infrared light signal having 700 nm wavelength. To filter the unnecessary infrared noise 7, the infrared signal must be detected and then cancelled.

Figure 7B:
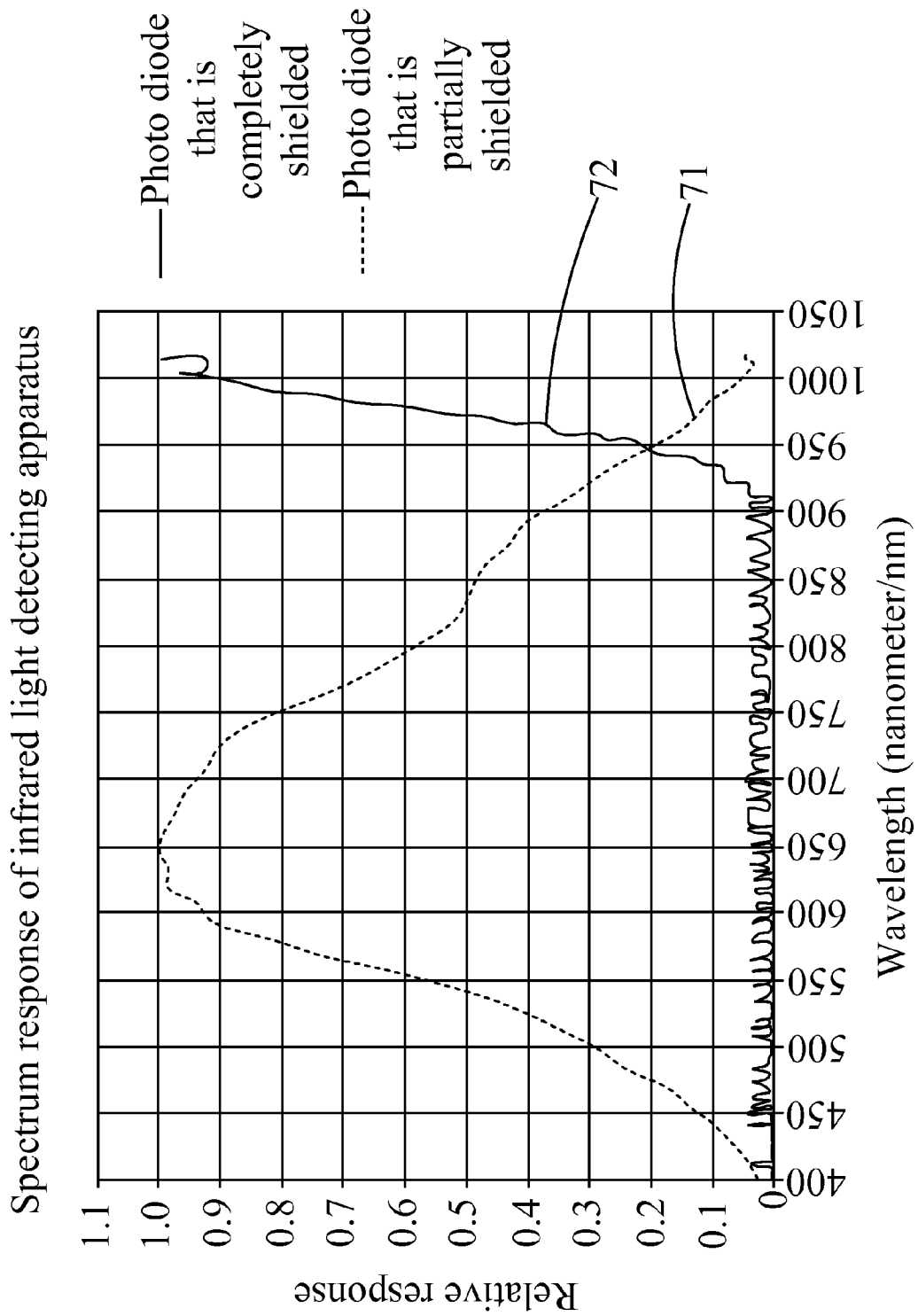
FIG. 7B is a spectrum response diagram of an infrared light detecting apparatus according to the fifth embodiment of the present invention.

With reference to FIG. 7B, in which a spectrum response diagram of an infrared light detecting apparatus according to a fifth embodiment of the present invention is depicted. In the figure, the photo diode 51 that is partially shielded can sense the photo sensing signal having a wide spectrum. Therefore, its spectrum response curve 71 comprises signals spreading across a wide range of wavelengths (400 nm to 1000 nm). Since the photo diode 51 that is partially shielded couples the infrared signal having above 900 nm wavelength in the sensed photo sensing signal to the photo diode 52 that is completely shielded, the spectrum response curved 72 of the photo diode 52 merely contains the infrared signal having above 900 nm wavelength. The infrared light detecting apparatus 5 of the present invention can actually detect the infrared light having longer wavelength to eliminate noise detected by the ambient light sensor and the multi-color RGB sensor, thereby enhancing the accuracy.

Figure 8:
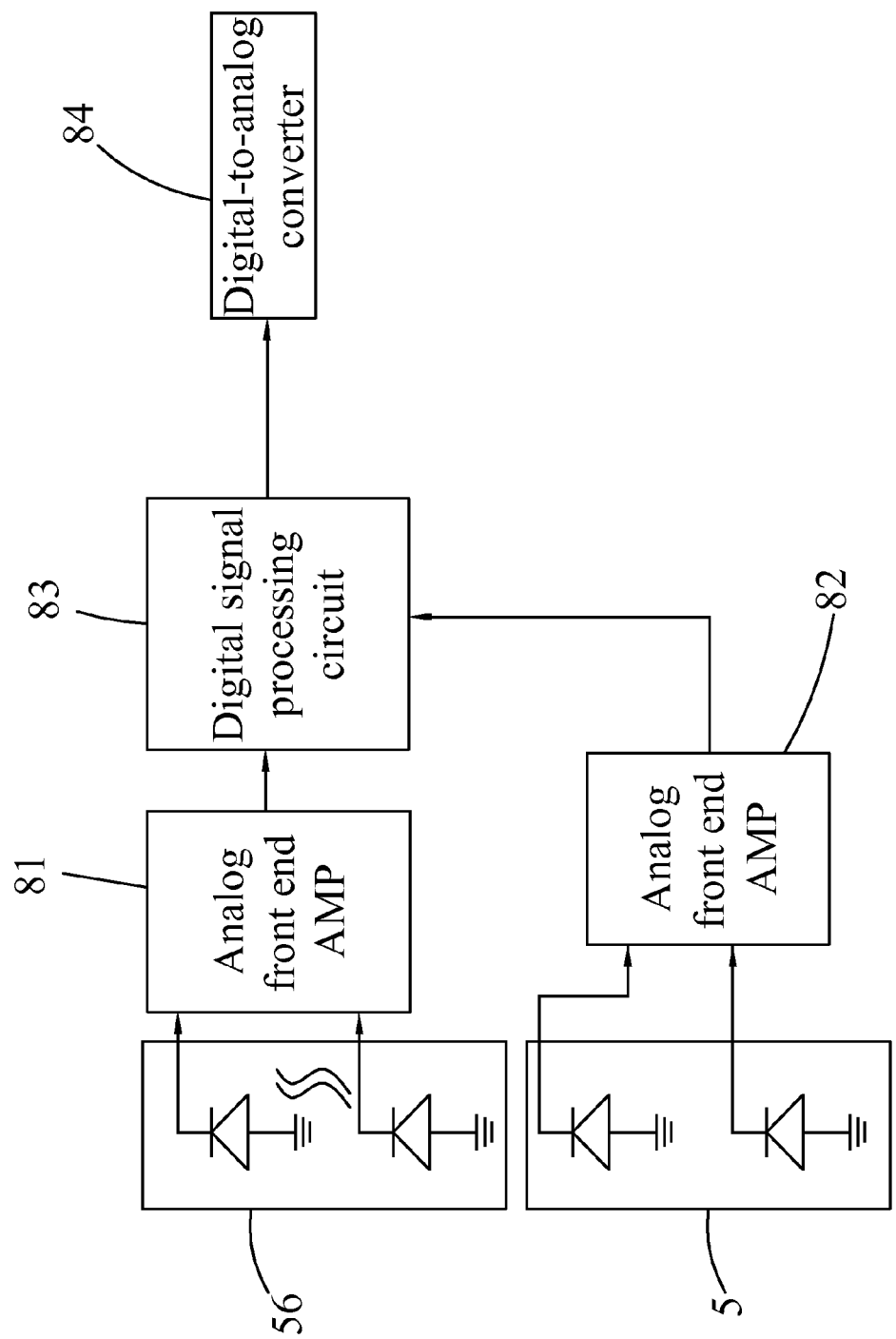
FIG. 8 is a circuit diagram of an infrared light detecting apparatus according to the fifth embodiment of the present invention.

With reference to FIG. 8, in which a circuit diagram of an infrared light detecting apparatus according to a fifth embodiment of the present invention is depicted. As shown in the figure, the infrared light detecting apparatus 5 of the present invention transmits the sensed photo sensing signal to an analog front end AMP 82. After processing with the analog front end AMP 82, the signals are transmitted to a digital signal processing circuit 83. The multi-color RGB sensor 56 also transmits the sensed photo sensing signal to the analog front end AMP 81. After processing with the analog front end AMP 81, the signals then are transmitted to the digital signal processing circuit 83. In the meantime, the digital signal processing circuit 83 eliminates the noise of the photo sensing signal having above 700 nm wavelength sensed by the multi-color RGB sensor 56 of the infrared light detecting apparatus 5 and then outputs the processed photo sensing signal through a digital-to-analog converter 84. Accordingly, the sensing accuracy of the multi-color RGB sensor 56 can be effectively improved.

Figure 9A:
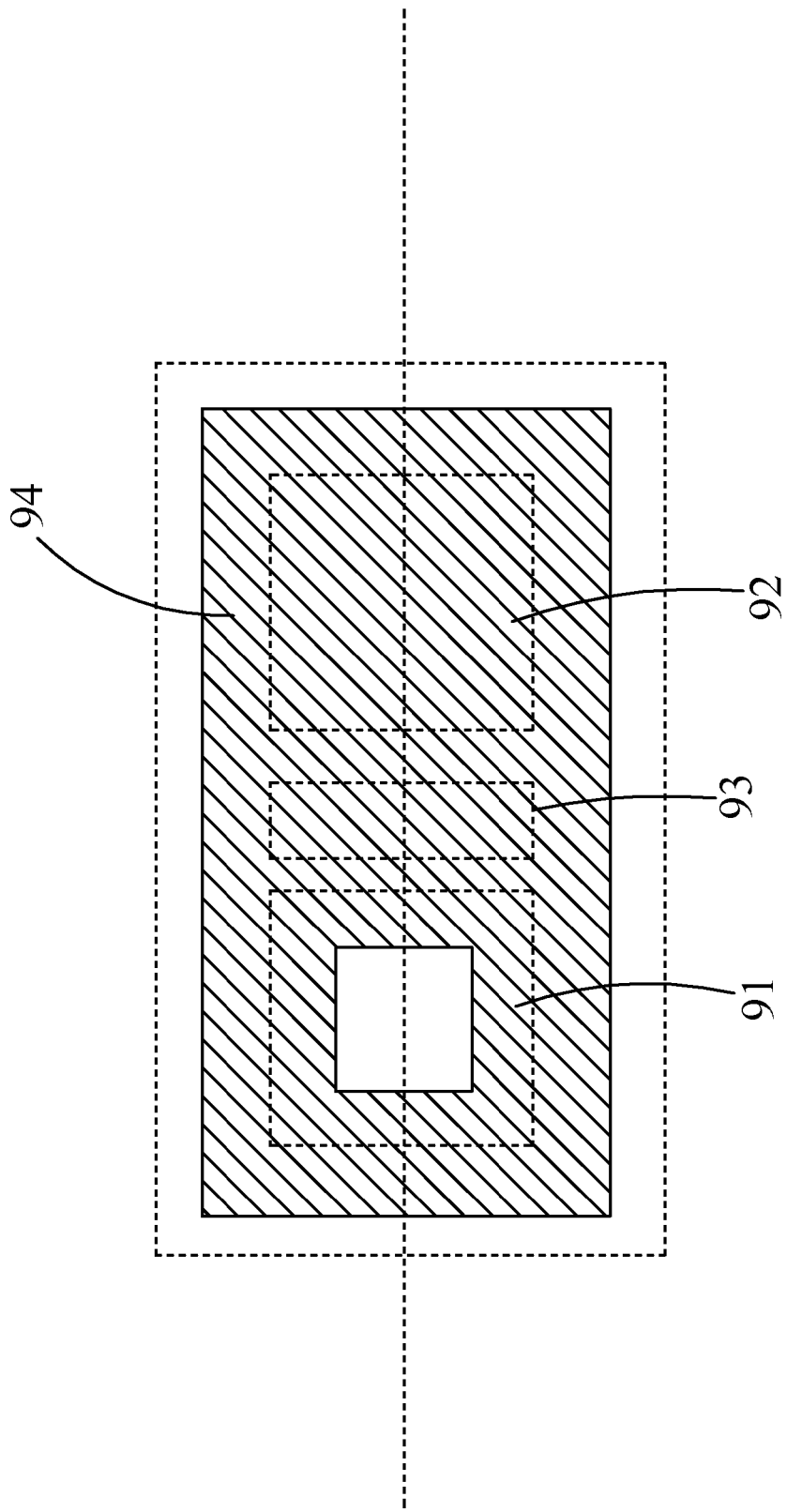
FIG. 9A is a circuit configuration diagram of an infrared light detecting apparatus according to the present invention.
Figure 9B:
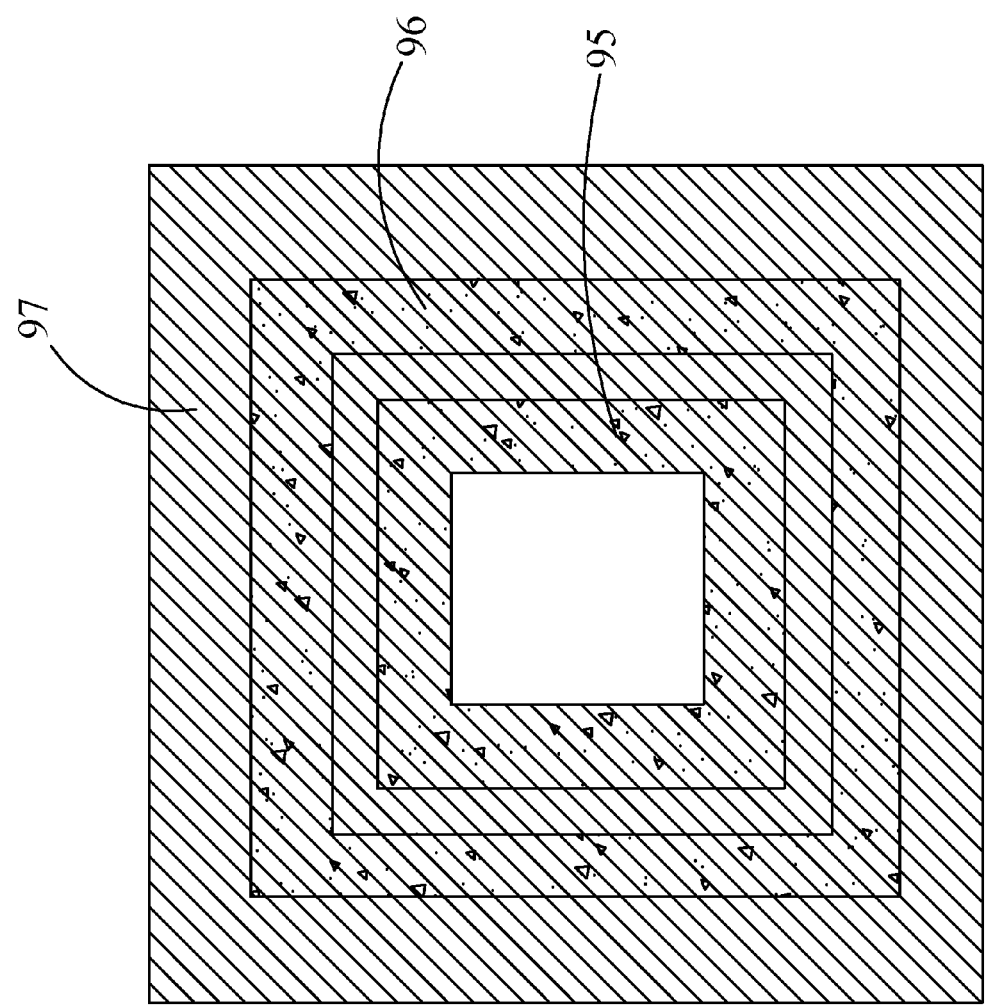
FIG. 9B is a circuit configuration diagram of an infrared light detecting apparatus according to the present invention.

With reference to FIG. 9A and FIG. 9B, in which circuit configuration diagrams of an infrared light detecting apparatus according to the present invention are depicted. In FIG. 9A, the photo diode 91 that is partially shielded and the photo diode 92 that is completely shielded are arranged on the same plane below the shield 94. Similarly, a gap 93 is arranged between the diodes. In FIG. 9B, a photo diode 95 that is partially shielded is disposed below the shield 97. A photo diode 96 that is completely shielded is disposed below the photo diode 95. A gap is also disposed between the photo diodes 95 and 96. The foregoing two manners are frequently seen and better configuration manners. The present invention may also have other configuration manners in addition to the foregoing two configuration manners and can be configured upon the demand of actual application.

A concept of infrared detecting method has been depicted while depicting the infrared light detecting apparatus of the present invention. To clearly depict the concept, the present invention also shows a flowchart regarding the infrared detecting method.

Figure 10:
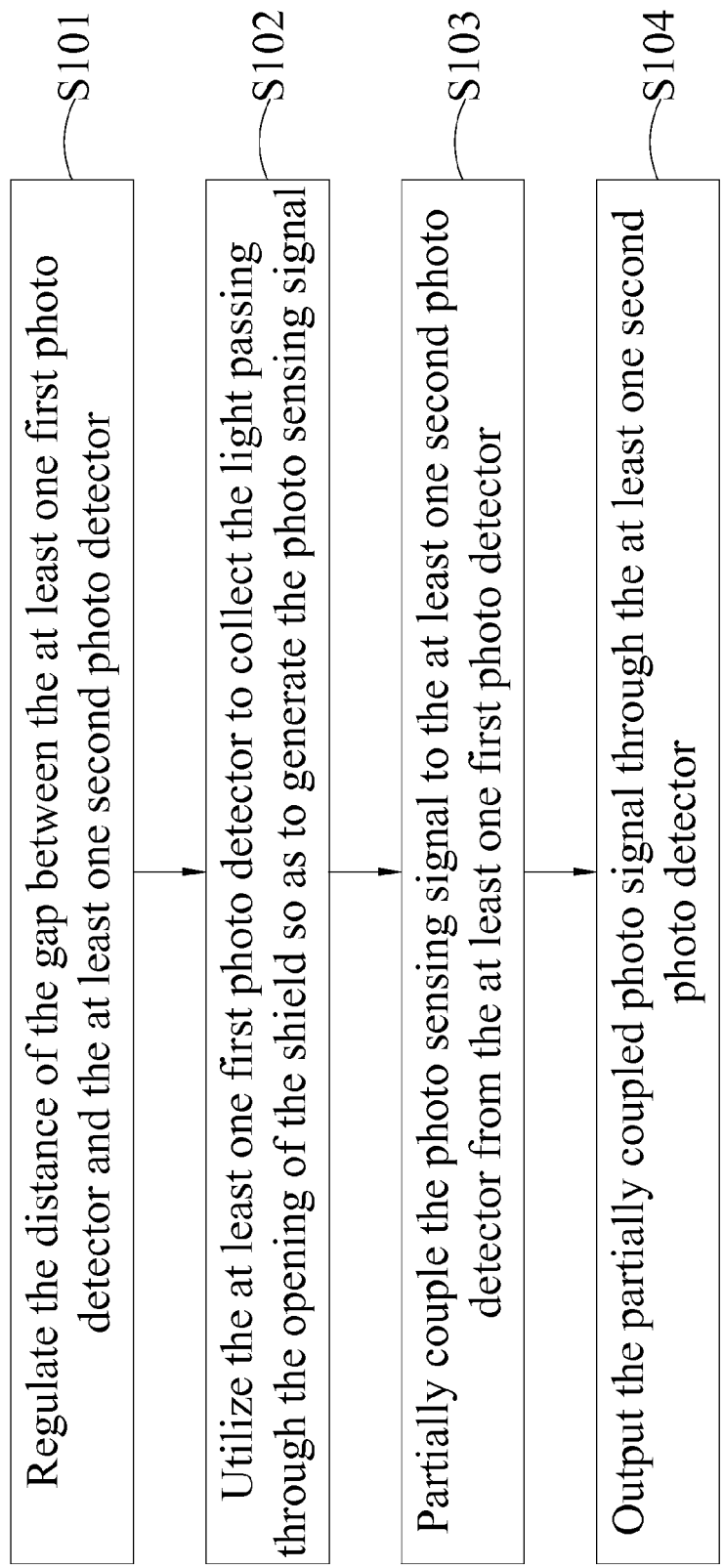
FIG. 10 is flowchart of an infrared detecting method according to the present invention.

With reference to FIG. 10, in which a flowchart of an infrared detecting method according to the present invention is depicted. As shown the figure, the infrared detecting method of the present invention is applied to an infrared light detecting apparatus. The infrared light detecting apparatus comprises a shield, at least one first photo detector, at least one second photo detector and a gap. The infrared detecting method of the infrared light detecting apparatus comprises the following steps.

(S101) Regulate a distance of the gap between the at least one first photo detector and the at least one second photo detector;

(S102) Utilize the at least one first photo detector to collect the light passing through the opening of the shield so as to generate the photo sensing signal;

(S103) Partially couple the photo sensing signal to the at least one second photo detector from the at least one first photo detector; and (S104) Output the partially coupled signal through the at least one second photo detector.

The detail description and the implementation of the infrared detecting method of the infrared light detecting apparatus according to the present invention have been depicted in the infrared light detecting apparatus of the present invention and are no longer described herein.

The infrared light detecting apparatus of the present invention can precisely detect the infrared portion of the light, and the present invention can be integrated with the multi-color RGB sensor or the ambient light sensor to perform the photo sensing, and provide optical correction factors so that the sensing error of the multi-color RGB sensor or the ambient sensor under conditions of different light sources can be improved to increase the accuracy thereof. Of course, the infrared light detecting apparatus of the present invention can also be independently used to detect the infrared portion of light, which has longer wavelengths. On the other hand, the infrared light detecting apparatus and the infrared detecting method of the present invention can be easily integrated with electric components, such as a complementary metal-oxide-semiconductor (CMOS) or a bipolar-complementary metal-oxide-semiconductor, thereby having higher practicality.

The present invention improves over the prior art and complies with patent application requirements, and thus is duly filed for patent application. While the present invention has been described by device of specific embodiments, numerous modifications and variations could be made thereto by those generally skilled in the art without departing from the scope and spirit of the present invention set forth in the claims.

What is claimed is:

1. An infrared light detecting apparatus, comprising:
   a shield for blocking light;
   at least one first photo detector located below the shield, and an opening being disposed on the shield at a position corresponding to the at least one first photo detector; and
   at least one second photo detector located below the shield;
   wherein the at least one first photo detector collects the light passing through the opening to generate a photo sensing signal, and the at least one second photo detector senses only a portion of the photo sensing signal, which is coupled to the at least one second photo detector from the at least one first photo detector, in order to output the portion of the photo sensing signal, wherein the wavelength of the portion of the photo sensing signal is longer than that of the other portion of the photo sensing signal.

2. The infrared light detecting apparatus as recited in claim 1, further comprising a gap arranged between the at least one first photo detector and the at least one second photo detector, wherein the coupling visible and infrared wavelengths of the partially coupled photo sensing signal to the at least one first photo detector is varied according to a distance of the gap.

3. The infrared light detecting apparatus as recited in claim 2, wherein the opening is smaller than an area of the at least one first photo detector.

4. The infrared light detecting apparatus as recited in claim 3, wherein a shape of the opening is a cross, a circle, a triangle, a rectangle or a polygon.

5. The infrared light detecting apparatus as recited in claim 4, wherein the at least one first photo detector and the at least one second photo detector are on a same plane.

6. The infrared light detecting apparatus as recited in claim 4, wherein the at least one first photo detector is located above or on the at least one second photo detector.

7. The infrared light detecting apparatus as recited in claim 4, wherein a material of the shield comprises aluminum, copper, polysilicon or a black polymer dielectric layer.

8. The infrared light detecting apparatus as recited in claim 4, wherein the first photo detector and the second photo detector are photo diodes.

9. An infrared detecting method, comprising the following steps of:
   utilizing at least one first photo detector to collect the light passing through an opening of a shield above the at least one first photo detector to generate a photo sensing signal;
   utilizing at least one second photo detector to sense only a portion of the photo sensing signal, which is coupled to the at least one second photo detector from the at least one first photo detector, wherein the wavelength of the portion of the photo sensing signal is longer than that of the other portion of the photo sensing signal, and
   outputting the portion of the photo sensing signal through the at least one second photo detector.

10. The infrared detecting method as recited in claim 9, further comprising steps of:
    regulating a distance of a gap arranged between the at least one first photo detector and the at least one second photo detector to change the coupling visible and infrared wavelengths of the partially coupled photo sensing signal from the at least one first photo detector.

11. The infrared detecting method as recited in claim 10, wherein the opening is smaller than an area of the at least one first photo detector.

12. The infrared detecting method as recited in claim 11, wherein a shape of the opening is a cross, a circle, a triangle, a rectangle or a polygon.

13. The infrared detecting method as recited in claim 12, wherein the at least one first photo detector and the at least one second photo detector are on a same plane.

14. The infrared detecting method as recited in claim 12, wherein the at least one first photo detector is located above or on the at least one second photo detector.

15. The infrared detecting method as recited in claim 12, wherein a material of the shield comprises aluminum, copper, polysilicon or a black polymer dielectric layer.

16. The infrared detecting method as recited in claim 12, wherein the first photo detector and the second photo detector are photo diodes.

* * * * *